Sept. 25, 1962 G. J. BYSSING ET AL 3,055,469
SUSPENDED CEILING
Filed May 2, 1960 5 Sheets-Sheet 1
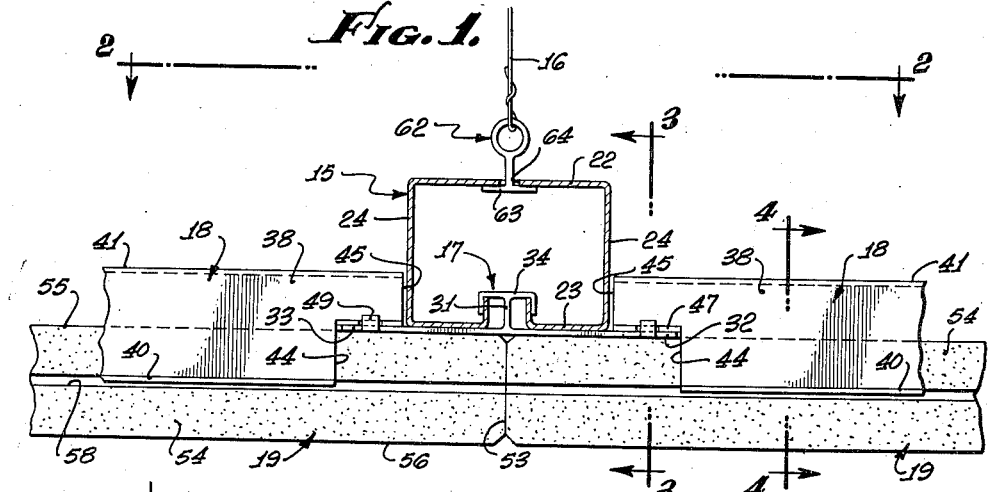
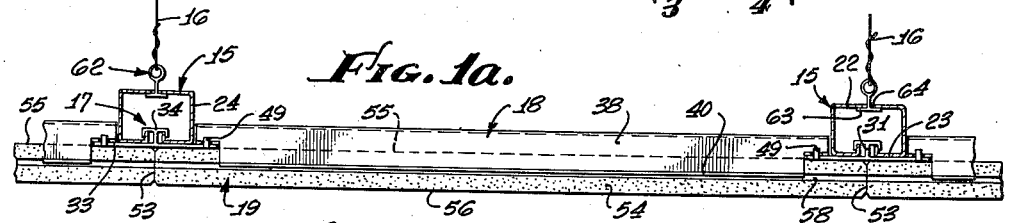
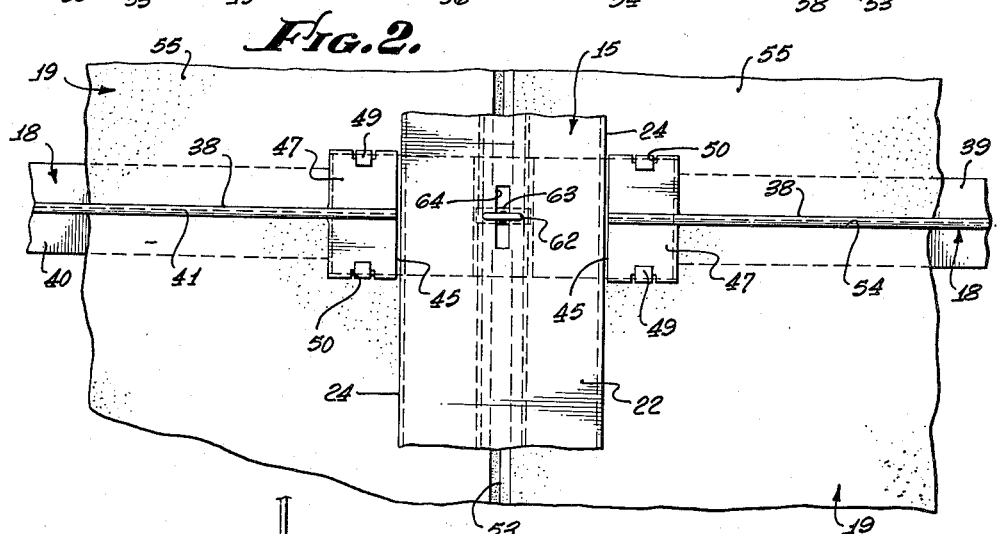
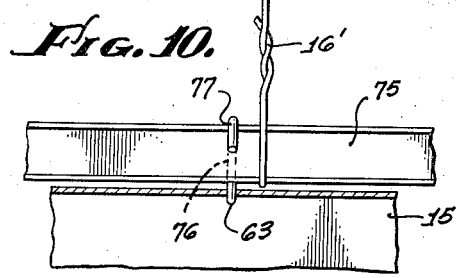
INVENTORS.
GEORGE J. BYSSING
WALTER G. MEZIERE
By
Beehler & Shanahan
ATTORNEYS.

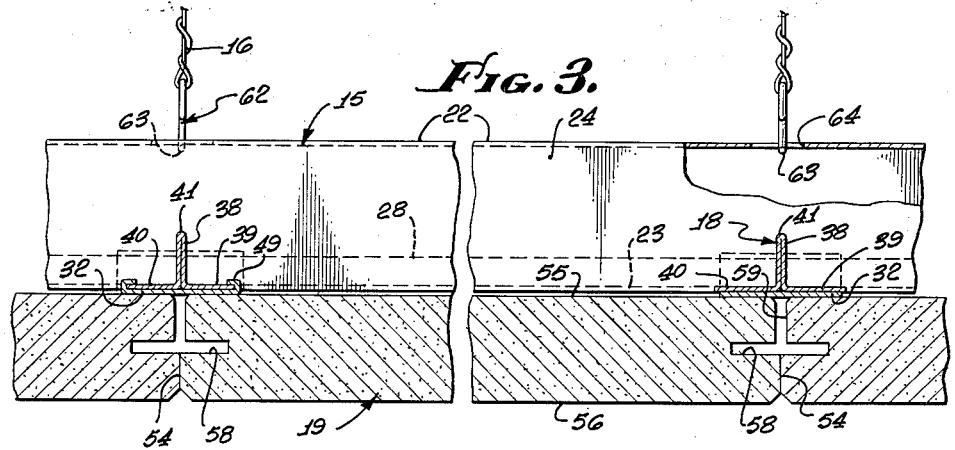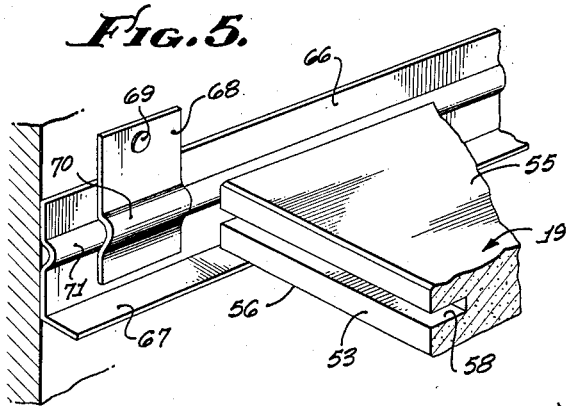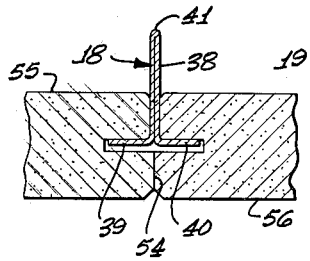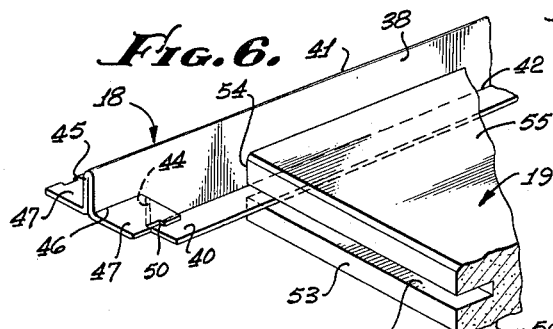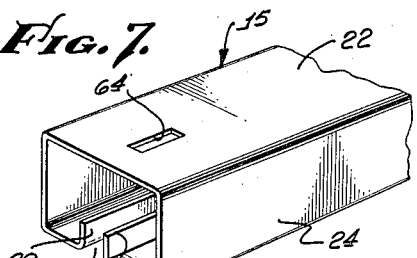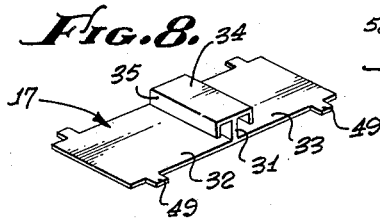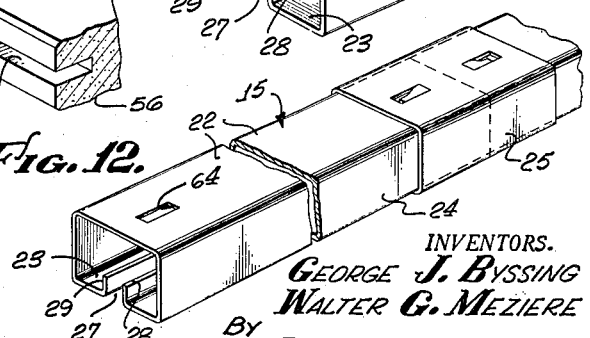

Sept. 25, 1962  G. J. BYSSING ET AL  3,055,469
SUSPENDED CEILING
Filed May 2, 1960  5 Sheets-Sheet 3
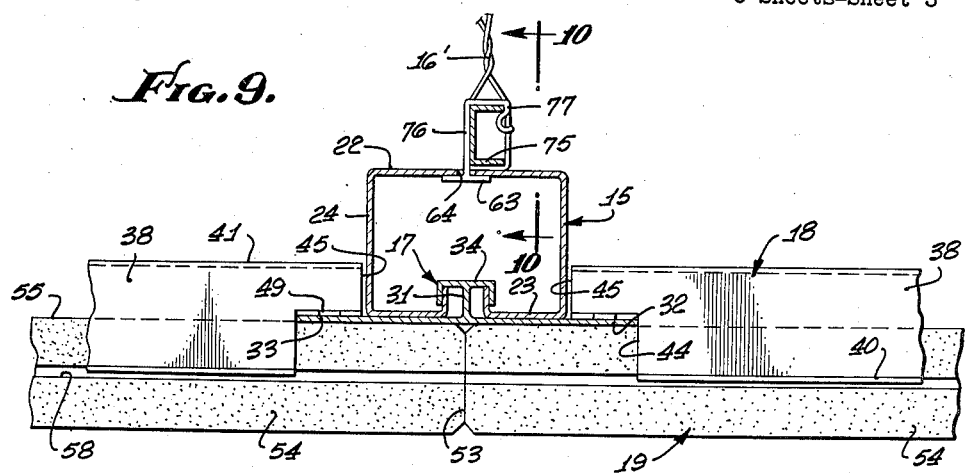
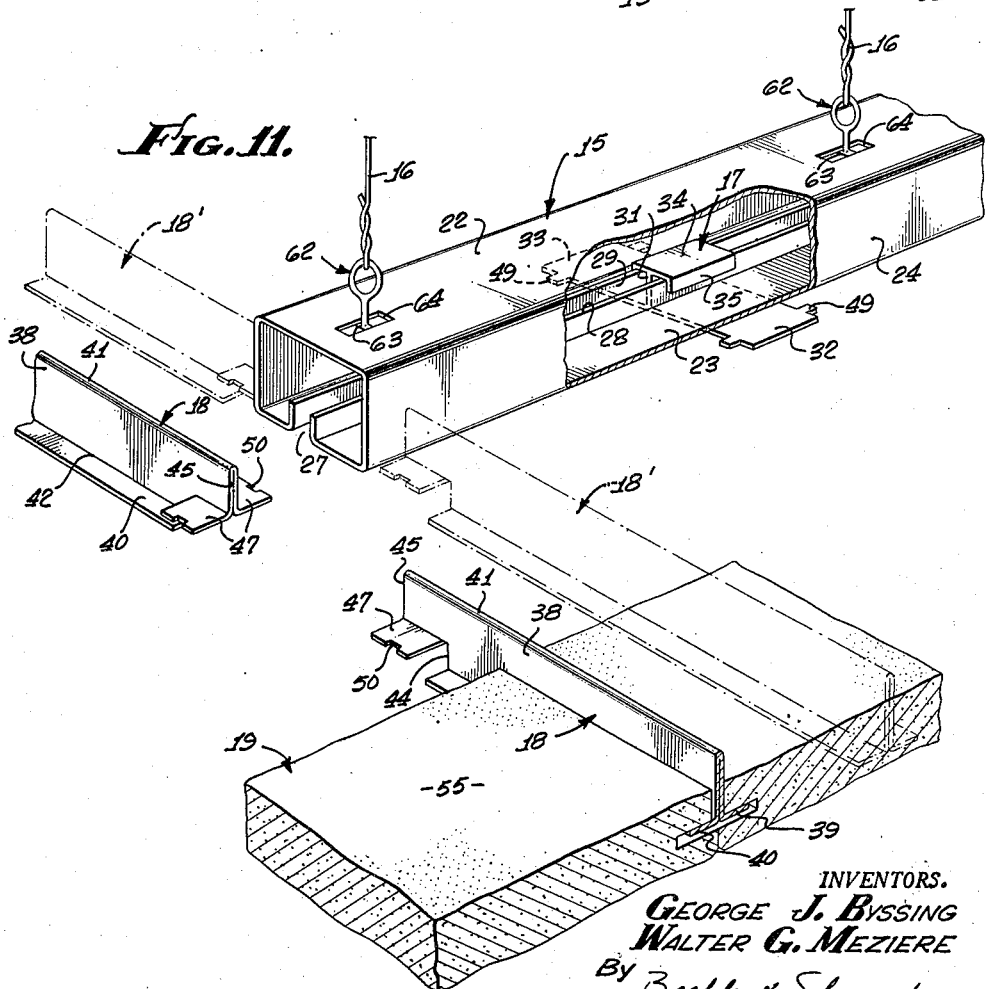
INVENTORS.
GEORGE J. BYSSING
WALTER G. MEZIERE
By Beehler & Shanahan
ATTORNEYS.

Sept. 25, 1962 G. J. BYSSING ET AL 3,055,469
SUSPENDED CEILING
Filed May 2, 1960 5 Sheets-Sheet 4

GEORGE J. BYSSING
WALTER G. MEZIERE
INVENTORS.

BY Beehler & Shanahan
ATTORNEYS.

Sept. 25, 1962                G. J. BYSSING ET AL                3,055,469
                                SUSPENDED CEILING
Filed May 2, 1960
                                                              5 Sheets-Sheet 5
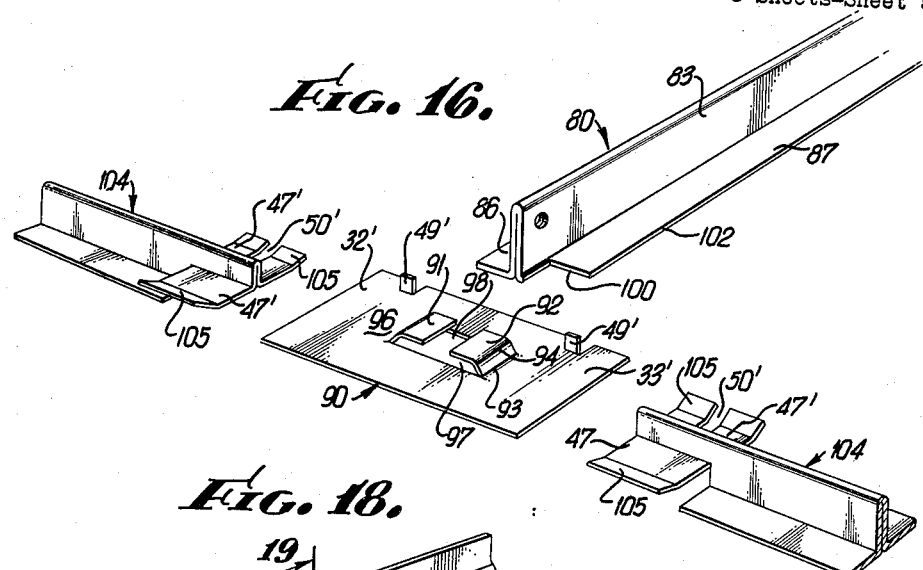
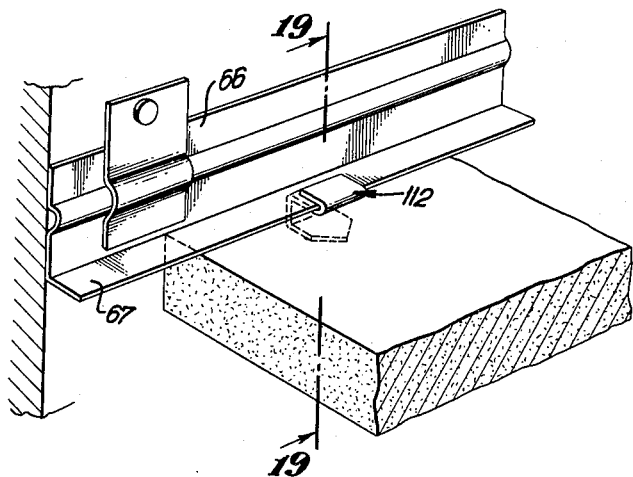
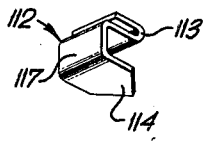
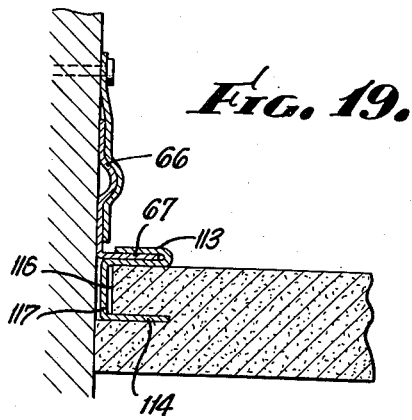
GEORGE J. BYSSING
WALTER G. MEZIERE
       INVENTORS.
BY  *Beehler & Shanahan*
              ATTORNEYS.

United States Patent Office 3,055,469
Patented Sept. 25, 1962

3,055,469
SUSPENDED CEILING
George J. Byssing, 1442 Elevada St., Los Angeles, Calif., and Walter G. Meziere, 9024 Reichling Lane, Rivera, Calif.
Filed May 2, 1960, Ser. No. 26,345
20 Claims. (Cl. 189—85)

This invention relates to ceiling construction, and more particularly to a ceiling adapted to be suspended, as from the rafters of a building or from a ceiling in the building to, in effect, lower a room ceiling.

This application is a continuation-in-part of our now abandoned copending application, Serial No. 788,871, filed January 26, 1959.

Ceilings of the type to which this invention relates are characterized as comprising a plurality of parallel runners and a plurality of cross members or bars to provide a grid network defining rectangular spaces, and a plurality of panels disposed in said spaces, respectively, and resting on the bars.

It is an object of this invention to provide an improved ceiling of the above mentioned character in which the runners and bars are concealed by the panels.

Another object of this invention is to provide a ceiling of the above mentioned character in which the slight space between abutting edges of the several panels is covered against free flow of air therethrough, whereby the ceiling is not subject to breathing between panels. In the case of a suspended ceiling in which breathing occurs, the exposed surfaces of the panels become soiled or darkened along their margins as a result of flow of dust-laden air between the panels.

Still another object of this invention is to provide a suspended ceiling construction in which at least certain elements of the structure by which the panels are supported from the runners may be moved longitudinally of the runners thereby to enable easy and simple installation and easy and simple removal of a panel or panels from an installed ceiling.

General objects of this invention are to provide a ceiling of the above-mentioned character which is adapted to be manufactured economically, may be installed easily and simply, is rugged in construction, and is reliable in service.

Further objects and advantages of this invention will appear during the course of the following part of this specification wherein the details of construction and mode of installation of several embodiments of the invention are described with reference to the accompanying drawing, in which:

FIG. 1 is a section through a portion of a suspended ceiling of this invention taken along a vertical plane;

FIG. 1a is a vertical section on a reduced scale, through a larger portion of the ceiling;

FIG. 2 is a plan view of the ceiling portion shown in FIG. 1 taken from the top side of the ceiling in the direction of arrows 2—2 of FIG. 1;

FIG. 3 is a section taken along line 3—3 of FIG. 1;

FIG. 4 is a detail section taken along line 4—4 of FIG. 1;

FIG. 5 is a perspective view of a portion of a panel of the ceiling of this invention and a portion of a wall molding for supporting ceiling panels along panel edges where the panels meet a vertical wall of a room in which the suspended ceiling is installed;

FIG. 6 is a perspective view of a portion of a panel and a portion of a cross-bar of the ceiling;

FIG. 7 is a perspective view of an end portion of a runner of the ceiling;

FIG. 8 is a perspective view of a hanger element for suspending the ends of two cross-bars from a runner;

FIG. 9 is a section similar to that of FIG. 1, but showing an alternative form of a clip for suspending the runners from a channel bar for the ceiling;

FIG. 10 is a detail section taken along line 10—10 of FIG. 9;

FIG. 11 is a perspective view of portions of a runner and two cross-bars with the bars being shown in phantom as the same are disposed in installed position, and being shown in full lines and associated with panel portions in a dropped position as for removing panels from an installed ceiling;

FIG. 12 is a perspective view of two runner sections of the ceiling, connected end to end;

FIG. 16 is an exploded view in perspective of runner, supporting element and cross-bars of the embodiment shown in FIGS. 13, 14 and 15;

FIG. 18 is a perspective view of a portion of a ceiling illustrating a structure of this invention by which ceiling panels may be supported along an end wall of a room with no part of the panel-supporting structure being exposed to view from below the ceiling;

FIG. 19 is a vertical section through the end wall structure of FIG. 18, the section being taken along line 19—19 of FIG. 18; and, FIG. 20 is a perspective view of a mounting clip of the end wall support structure of FIGS. 18 and 19.

Figure 13:
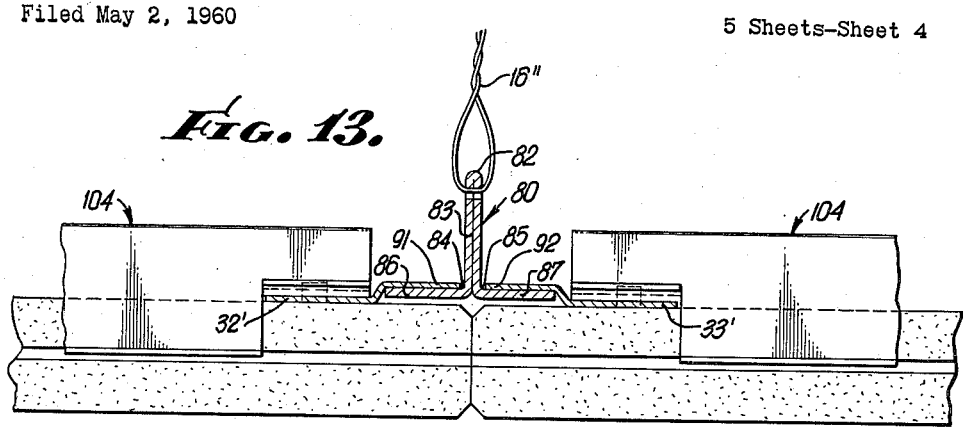
FIG. 13 is a vertical section through a portion of a ceiling of another embodiment of this invention, the section being taken along line 13—13 of FIG. 14.
Figure 14:
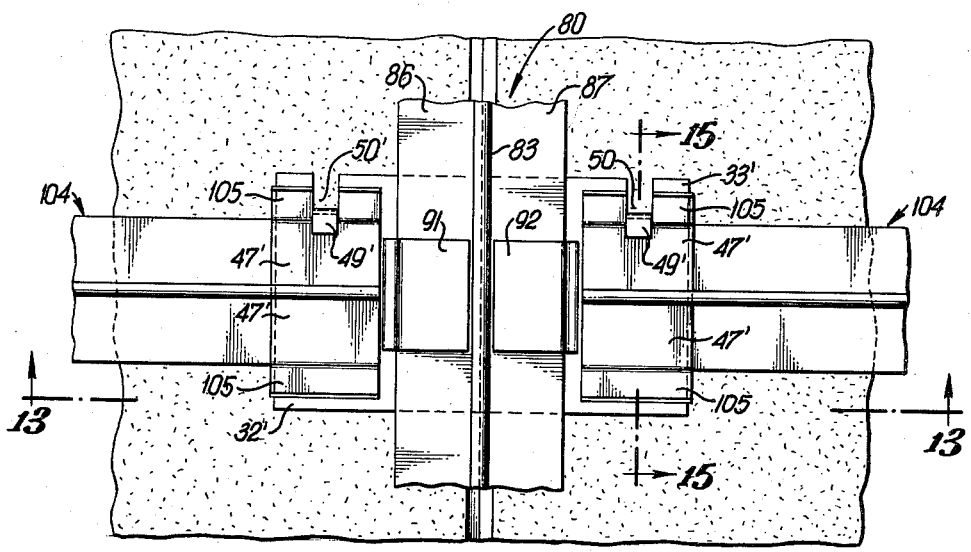
FIG. 14 is a plan view of the ceiling portion shown in FIG. 13.

Referring in greater detail to FIGS. 1 to 12 inclusive, of the drawing, there is shown various portions of a suspended ceiling construction, as for lowering the ceiling of a room of a building, the suspended ceiling comprising a plurality of uniformly spaced apart runners 15, a plurality of wires 16 for suspending the runners from a permanent ceiling (not shown) of the building, a plurality of hanger elements 17 depending from the runners, a plurality of cross members or bars 18 resting at their ends upon the hanger elements and extending transversely between pairs of adjacent runners to form a grid network of the bars and runners defining rectangular spaces, and a plurality of panels 19 disposed in the spaces, respectively, and supported by the cross-bars.

The runners may be formed of any suitable stiff material, preferably sheet metal. Those of FIGURES 1–12 are of hollow construction having an upper wall 22, lower wall 23 and two side walls 24. The runners may be of any desired length. For an installation in which the runners at hand are not long enough to span the space between opposite side walls of a room in which the lowered ceiling is being installed, runner sections may be spliced together in end to end relationship as with a short sleeve shown at 25 in FIG. 12.

The bottom wall of each runner has a longitudinally extending slot 27 formed therein. The slot may be formed by making a single slit medially along the runner to form slit defining edges 28, and then bending the edge marginal portions 29 upwardly into the runner. In the illustrated embodiment the slots 27 for the respective runner extend throughout the length of their runners; however, we desire to have it understood that the slots 27 need not be coextensive with the runner, but instead may consist of a plurality of aligned slot sections.

The runners support the hanger elements or slip-clips 17, a hanger for the illustrated ceiling of FIGS. 1 to 12 being shown best in FIG. 8 of the drawing. Each such hanger 17 comprises a vertically disposed stem portion 31, two wings 32 and 33 extending outwardly in opposite directions from the stem, and a head 34 integral with the upper end of the stem. The hanger stems extend through a runner slot 27, and the hanger heads rest upon the upper edges 28 of the slot-defining marginal portions 29. The hangers are slidable longitudinally of the runners. For maintaining the hanger stems centrally of the runner slots, the hanger heads may have their end marginal portions bent downwardly as at 35 to engage the remote surfaces of the marginal portions 29.

The hanger stems are preferably made to a vertical height such that the wings 32, 33 are adjacent the lower walls of the runners. The wings are made to a length such that they will extend transversely of the runners beyond the runner side walls.

Referring now to the details of construction of the cross-bars 18 of the illustrated ceiling, these are designed to extend transversely between a pair of adjacent runners. The bars are preferably of inverted T configuration for supporting the panels 19. The T configuration of the bars is defined by a vertically extending leg portion 38 and a cross portion of flanges 39 and 40 which extend in opposite directions from the leg portion, and preferably at right angle to the leg portion. As is the case for the runners, the T-bars may be formed from a flat blank of sheet metal, as by bending a strip of sheet metal upon itself along its longitudinal medial line 41 with each half portion of the strip being bent along longitudinally extending lines 42 to provide the outwardly extending flanges 39 and 40.

To provide stability in the resting of the T-bars at their ends upon the hanger wings, the T-bars are cut along a line 44 spaced inwardly from an end edge 45 of the T-bars, to extend through the flanges 39, 40, and upwardly into the leg portion 38 where the cut 44 terminates short of the upper edge 41. Thus, the end portions of the T-bars may be bent along longitudinally extending bend lines 46 to provide two outwardly extending feet 47 which rest upon the wings of the hanger members. It will be noted that the plane of the T-bar flanges 39, 40 is below that of the hanger wings and the feet of the T-bars.

Certain of the T-bars are connected at their end portions to their respective hangers 17 for the purpose of providing rigidity in the suspended ceiling. Others of the T-bars are intended to merely rest at their foot portions upon the wings of their respective hangers, whereby they may be dropped from the ceiling as by sliding their hangers from under the foot portions. After the runners are hung, the T-bars and hangers will be spaced along the runners by a distance equal to the width of the panels to be installed. Conventional panels range in width from about one to four feet. We have found that sufficient rigidity for the ceiling is had by securing every fourth T-bar to its hanger. A suitable means for fastening every fourth T-bar to its hangers, in the case where the hangers 17 are formed from sheet metal, is provided by small tongues 49 which extend outwardly from the side edges of each hanger, and recesses 50 in the end edges of the foot portions 47, whereby the tongues of every fourth hanger may be bent upwardly into the recesses 50 and then bent against the upper surface of the foot portions as is shown in FIGS. 1, 2 and 3 of the drawing.

The panels 19 are flat rectangular pieces which may be formed from any suitable stiff material. For most installations panels formed from conventional acoustic material are employed, they commonly being called "acoustic tile." The surfaces which define a panel 19 are opposite end edges or surfaces 53, opposite side edges or surfaces 54, an upper surface 55, and an undersurface or lower surface 56 which is exposed for the new ceiling. The side surfaces 54 of the panels have longitudinally extending kerfs 58 formed therein for accommodating respective side flanges of the T-bars. For installations where square panels are employed, the kerfs may extend entirely around the panels.

The kerfs 58 are spaced from the upper surface of each panel by a dimension which will permit the T-bar flanges to be received in side kerfs of the panels and to allow the panels to extend under the wings of the hangers 17 whereby the end surfaces of adjacent panels will be in abutment under the runners. It is preferred, too, that the side surfaces of adjacent panels be in abutment with each other, and in cases where the leg portion 38 of the T-bars is of substantial thickness, the panels should be trimmed along that half of the side surfaces above the kerf to provide a space 59 for accommodating a T-bar stem.

It will be apparent from above that the ceiling of this invention is adapted to be easily installed. For convenience and simplicity in attaching the runners 15 to the suspending wires 16, clips 62 may be provided on the wires, such clips having outwardly extending fingers 63 which are receivable in elongate apertures 64 formed in the upper wall 22 of the runners whereby the clips may be rotated 90° to position the fingers against the undersurface of the upper wall of the runners. After the runners have been hung in a common horizontal plane extending between a pair of opposed side walls of a room, and with their hangers 17 fitted in the runner slots, the cross-bars 18 and the panels 19 may be quickly installed to complete the ceiling.

Access to the space above the suspended ceiling is provided by removing a panel or panels. This is accomplished easily by sliding a hanger from under the end portions of aligned T-bars at the place where access is desired as best illustrated in FIG. 11 of the drawing. For that purpose, a knife blade (not shown) may be inserted between the abutting end surfaces 53 of a pair of adjacent panels under a runner at the selected place for access. The knife blade is then moved longitudinally of the runner in the runner slot 27 to engage a hanger 17 and to slide the hanger longitudinally of the runner from under the end portions of a pair of aligned T-bars, whereby the T-bars are free to be dropped from the broken line position 18' in FIG. 11 to their full line positions. Sliding of two adjacent hangers from under the end portions of their respective T-bars and allowing the released T-bars to incline slightly downwardly from the plane of the ceiling permits that panel which is supported by and between the released pair of adjacent cross-bars to be removed easily by sliding the panel out from the flanges of the T-bars.

For supporting the peripheral panels of the ceiling at the walls of the room, we provide a molding 66 (FIG. 5) having an outwardly projecting narrow flange 67 upon which an edge of the peripheral panels rests. Such molding may be attached to the walls of the room as with clips 68 which are fastened as with a nail 69 to the room wall. Each such clip has a transversely extending crimp 70 formed therein, and the molding has a complementary crimp 71 extending longitudinally thereof whereby the molding may be pushed up under the clips 68 to fit the molding crimp in the crimps of the clips.

In the arrangement illustrated in FIG. 5 for supporting the edges of peripheral panels where they meet the vertical walls of a room in which the suspended ceiling is installed, the panels rest upon the molding flange 67, and thus the underside of the molding flange is exposed to view from below the ceiling. When the molding 66 is employed in the illustrated exposed arrangement of FIG. 5 along a room wall (usually a side wall of the room) which is parallel to the runners, the panels being trimmed down as required to fit between the side wall molding and its next adjacent runner, the cross-bars are likewise cut off as required to be received between the side wall molding and its next adjacent runner. When the molding 66 is employed in an exposed arrangement along an end wall of a room which is perpendicular to the runners, such end wall molding 66 serves as a support in the place of the cross-bars for the panel edges which meet the end wall of the room.

In the case where it is desired to install a ceiling of this invention in an arrangement wherein the wall molding along a side wall of a room is concealed from view and the panels extend to a position of flush abutment against the side wall of the room, it is but a simple operation to cut the cross-bars 18 to a proper length and bend up new foot portions 47 at the side wall end of the cross-bars, whereby the cross-bars will rest at their new foot portions upon the flange portion 67 of a wall molding, thereby to support the panels in a position extending under the wall molding similarly as in the arrangement of FIG. 1, for example, where the panels are shown as extending under the runners which support the cross-bars.

In FIGS. 9 and 10, another form of means for suspending the runners is shown. In cases where it is desired to install channel beams, such as are shown at 75 hung by wires 16' to provide additional support for the runners, inverted J-shaped clips may be employed to suspend the runners from the channel beams. As in the case of the clips 62 previously described, the J-shaped clips 76 have outwardly extending fingers 63' which may be inserted in the apertures 64 of the runners 15 to engage the clips in the runners. A foot portion 77 of the J-clip is hooked over the top of the channel beam to attach the clip to the beam.

Referring now to FIGS. 13 to 16 inclusive, there is shown another form for the runners, hangers and cross-bars of the ceilings of this invention. In this embodiment the runners are T-shaped in cross-section, they being designated generally by reference numeral 80. Such T-shaped runners 80 may be formed from an elongate sheet or flat strip of metal as in the illustrated embodiment, by bending such strip of metal upon itself along its medial longitudinal line at 82 to bring its two halves against each other to form the stem portion 83 of the T-shaped runner. The half portions of the strip are then bent along longitudinally extending lines at 84 and 85 to form a cross-portion for the T, consisting of arms 86 and 87 which extend perpendicularly from the stem portion 83.

Slip clips or hanger elements 90, which correspond in function to the hangers 17 of the previously described embodiment, are employed with the T-shaped runners 80 for supporting the cross-bars of the ceiling. A hanger 90 may be formed from a blank of sheet metal, shown in the illustrated embodiment as being rectangular in outline. Two lugs or ears 91 and 92 are struck up from a flat sheet from which the hanger 90 is formed, the ears being bent along lines 93 and 94 whereby the free ends of the ears are spaced above the upper surface 96 of the flat portion of the hanger to an extent indicated by gap 97. Thus the hangers 90 are adapted to be supported by the runners 80 with the flat sheet portion of the hangers being disposed under the undersurface of the runners 80 and the ears 91 and 92 extending over the cross-arms 86 and 87, respectively, of the runner, the stem portion of the runner extending through a gap 98 between the free ends of the ears 91 and 92.

For the purpose of making it simple and easy to attach the hangers 90 to the runners after the runners have been suspended in installed position as with the use of suspending wires 16'', an end portion of each runner may be notched at 100 (FIG. 16) whereby the hangers 90 may be fitted on the runners from a position below the runners rather than requiring fitting by inserting the hangers over an extreme end of a runner.

The hanger elements 90 are slidable longitudinally of the runners 80, and as in the case of the previously described hangers 17, the hangers 90 extend transversely of the runners beyond the free end edges 102 of the cross-portion of the T-shaped runners. Thus the end marginal portions 32' and 33' of the hangers 90 function as wings 32 and 33 of the hangers 17 to provide a support surface upon which the ends of the cross-bars rest.

The cross-bars of the illustrated embodiment of FIGS. 13–16 are designated by reference numeral 104, they being generally similar in construction to the cross-bars 18 of the previously described embodiment. The cross-bars 104 have foot portions 47' at the ends thereof for resting upon the wing or end marginal portions 32' and 33' of the hangers 90. The foot portions 47' are generally similar to those of the previously described cross-bars 18, but in the case of the foot portions 47', the side marginal portions 105 thereof are bent to incline slightly upwardly so that when a hanger element is moved longitudinally of its runner from under the ends of the cross-bars which it supports, thereby to drop the cross-bars and the panels which they support as in the manner illustrated in FIG. 11 of the drawing, the side edges of the foot portions 47' will not cut into the upper surfaces of the panels. Also in the case of the foot portions 47', there is but a single recess 50' formed in a side edge of the foot portion 47', and the hangers 90 are provided with but a single tongue 49' in each wing portion of the hanger 90, for securing the cross-bars 104 to the hangers 90 for the purpose of making the ceiling more rigid. The tongues 49' extend through the recesses 50' and are then bent over upon the upper surface of the foot portions 47' as appears best in FIGS. 14 and 15. In the case where a single tongue and recess connection is employed as in the embodiment of FIGS. 13 to 16, each cross-bar may be secured to its supporting hanger and still the hangers may be slid longitudinally of the runners from under the ends of the cross-bars. In this case, however, the hangers 90 may be slid in one direction only, that is to disengage the bent-over tongues 49' outwardly from the recesses 50'.

Figures 15, 17:
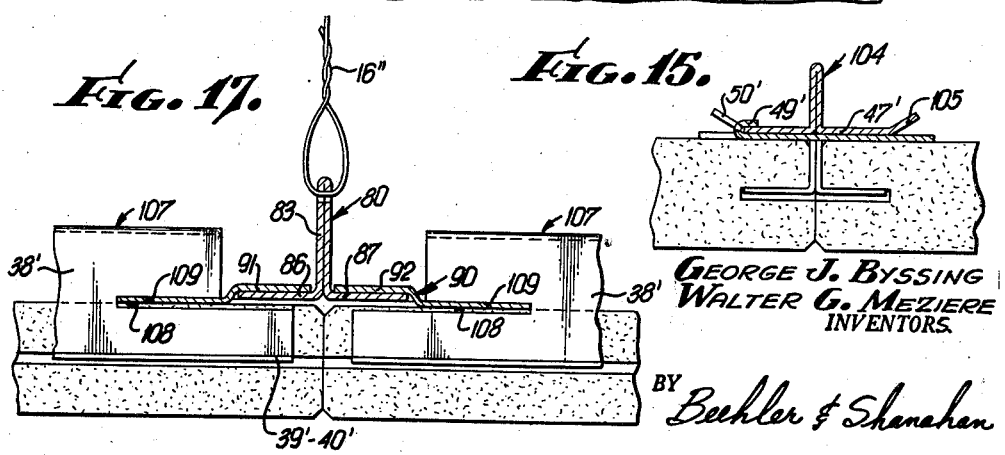
FIG. 15 is a detail section taken along line 15—15 of FIG. 14.
FIG. 17 is a vertical section corresponding in arrangement to FIGS. 1 and 13 but showing still another embodiment of a ceiling of this invention.

In FIG. 17 a ceiling construction of this invention is shown as comprising cross-bars 107 of T-shape cross-section in which the cross portion 39'—40' thereof extend under the hangers 90. The hangers 90 extend into slots 108 formed in the stem or leg portion 38', the surface 109 which defines the upper side of the slots 108 as viewed in FIG. 17 being that foot portion surface at which the cross-bars 107 rest on the hangers 90.

Referring now to FIGS. 18, 19 and 20, there is illustrated a supporting structure by which the panels may be supported along their edges where they abut against an end wall (perpendicular to the runners) of a room, in an arrangement such that the end wall supporting structure will be concealed from view and the panels will extend to a position of flush abutment against the end wall of the room. The end wall support structure of FIGS. 18, 19 and 20 comprises a wall molding 66 having a horizontally extending lower flange 67 as has been previously described hereinabove with particular reference to FIG. 5. The support structure of FIGS. 18–20 includes a plurality of attachment clips 112 formed from a flat strip of sheet metal for example, to an inverted S-shape, such that the upper loop 113 thereof will receive the molding flange 67, while the lower end 114 of the attachment clip is pointed so that it may be easily forced into the body of a panel thus to suspend the panel from the wall molding. After the panels next adjacent an end wall of the room are cut or trimmed down to fit between the vertical end wall and its next adjacent crossbar 18 or 104, the panels are notched as at 116 in order to accommodate the vertically extending portion 117 of the attachment clips so that the panels may extend to flush abutment against the vertical end wall of the room in which the ceiling is installed.

While the instant invention has been shown and described herein, in what is conceived to be the most practical and preferred embodiments, it is recognized that departures may be made therefrom within the scope of the invention, which is therefore not to be limited to the details disclosed herein, but is to be accorded the full scope of the claims.

Having described the invention, what is claimed as new in support of Letters Patent is:

1. A ceiling construction comprising a plurality of elongate runners adapted to be suspended from a support structure in parallel relationship, a plurality of hangers supported by and slidable longitudinally of the runners, each hanger extending transversely beyond both sides of its respective runner, a plurality of elongate cross members extending perpendicularly between respective pairs of the runners with the end portions of the cross members resting on the hangers respectively to form a grid network defining rectangular spaces, and a plurality of flat panels spanning said spaces respectively and resting on the cross members, a selected number of the hangers being slidable from under their respective cross members thereby to permit dropping of said selected number of hangers to release the panels.

2. A ceiling construction according to claim 1 in which all of the hangers are slidable from under their respective cross members in a direction longitudinally of their respective runners.

3. A ceiling construction according to claim 1 and comprising fastener means on certain of the cross members and hangers for attaching said certain cross members to their respective hangers.

4. A ceiling construction according to claim 3 in which each of said fasener means comprises a tongue and a groove, said tongue being releasable from engagement in said groove upon movement of a hanger in a given direction longitudinally of its runner.

5. A ceiling construction according to claim 1 in which said runners are T-shaped in cross section having a horizontally extending flat cross-portion and a stem portion extending vertically up from the cross-portion along the longitudinal medial line of the cross portion.

6. A ceiling construction according to claim 5 in which each of said hangers comprises a flat sheet portion extending in a plane under the plane of said cross-portion of a runner, and an ear extending upwardly from said flat sheet portion, and said cross members having a notch formed in each end portion thereof for engagement with said ears.

7. A ceiling construction according to claim 1 in which said runners are of hollow construction having a plurality of aligned slot sections formed therein and extending longitudinally of the runner, and said hangers have stem portions extending upwardly through said slot sections respectively and resting upon the inside surfaces of the hollow runners adjacent respective sides of said slot sections.

8. A ceiling construction comprising a plurality of elongate runners adapted to be suspended from a support structure in parallel and horizontally extending relationship with respect to each other, a plurality of hangers supported by and slidable longitudinally of the runners, each hanger extending transversely beyond its respective runner, a plurality of elongate cross members extending perpendicularly between respective pairs of the runners and having flat cross portions spaced below the runners, each cross member having two end portions rested on said hangers respectively, the cross members and the runners forming a grid network defining rectangular spaces, and a plurality of flat panels covering said spaces respectively, each panel having an upper surface, a lower surface, two opposed side surfaces, and two opposed end surfaces, each side surface having a longitudinally extending kerf formed therein and spaced between the upper and lower surfaces of the panels, said cross portions of the cross members extending into the kerfs of two adjacent panels respectively, and the panels extending under the runners with the panel upper surfaces being in a plane under said runners and with the end surfaces of two adjacent panels being disposed in surface toward surface relationship.

9. A ceiling construction adapted to be suspended from a supporting structure of a building and comprising a plurality of elongate runners, each runner having an undersurface, means for suspending the runners from said structure with the runners being disposed in a uniformly spaced apart and parallel relationship with their undersurfaces disposed in a common plane, a plurality of hangers supported by and slidable longitudinally of the runners, each hanger having flat wing portions extending transversely beyond its respective runner, said wing portions having upwardly facing surfaces, said wing portion surfaces being disposed in a common plane parallel to the said plane of the runners, a plurality of elongate cross members extending perpendicularly between the runners and each having a flat cross portion with said cross portions being disposed in a common plane parallel to and spaced below the said plane of the runners, each cross member having two foot portions integral therewith and disposed at opposite ends of the cross members, each foot portion having an undersurface spaced above the plane of the cross portions, the cross members being supported by said foot portions resting at the undersurfaces of the foot portions upon the upper surfaces of said flat wing portions, a selected number of the hangers being slidable from under their respective foot portions in a direction longitudinally of the runners, the cross members and the runners forming a grid network defining rectangular spaces, and a plurality of flat panels covering said spaces respectively, each panel having an upper surface, a lower surface, two opposed side surfaces, and two opposed end surfaces, each side surface having a longitudinally extending kerf formed therein and spaced between the upper and lower surfaces of the panels, said cross portions extending into the kerfs of two adjacent panels respectively, and the panels extending under the runners with the panel upper surfaces being in a common plane below the plane of the undersurfaces of the runners and with the end surfaces of two adjacent panels being disposed in surface toward surface relationship.

10. A ceiling construction adapted to be suspended from a supporting structure of a building and comprising a plurality of uniformly spaced apart runners, means adapted to be connected to the runners for suspending the runners from said structure, a plurality of hangers suspended from the runners and slidable longitudinally of the runners, a plurality of bars, each having two ends and extending transversely between a pair of adjacent runners and resting at their ends upon respective hangers to form a grid network of the bars and runners defining rectangular spaces, and a plurality of panels disposed in the spaces respectively, and resting on the bars, at least some of the bars being free of attachment to their respective hangers, whereby the unattached hangers may be slid in a direction longitudinally of the runners and from under the unattached bars for dropping the unattached bars and their adjacent panels from the ceiling.

11. A ceiling construction adapted to be suspended from a supporting structure of a building and comprising a plurality of uniformly spaced apart runners, means adapted to be connected to the runners for suspending the runners from said structure, a plurality of hangers suspended from the runners and slidable longitudinally of the runners, a plurality of bars, each having two ends and extending transversely between a pair of adjacent runners and resting at their ends upon respective hangers to form a grid network of the bars and runners defining rectangular spaces, the hangers having bar-supporting portions thereof disposed in a common horizontal plane, each bar having a vertically disposed leg portion and a cross portion integral with the leg portion, the cross portions of the bars being disposed in a common plane spaced below the first mentioned plane, and a plurality of panels disposed in said spaces respectively, each panel having straight side and end edges, the side edges of the panels having longitudinally extending kerfs formed therein, said cross portions being disposed in said kerfs, those panels which are proximate the runners being extended under the runners, adjacent panels under the runners being in edge to edge abutment, at least some of the bars being free of attachment to their respective hangers, whereby the unattached hangers may be slid in a direction longitudinally of the runners and from under the unattached bars for dropping the unattached bars and their adjacent panels from the ceiling.

12. A ceiling construction adapted to be suspended from a supporting structure of a building and comprising a plurality of uniformly spaced apart runners, the runners being hollow and each having an upper wall and a lower wall, the lower wall of each runner having a plurality of longitudinally extending and aligned slot sections formed therein, means adapted to be connected to the upper walls of the runners for suspending the runners from said structure, a plurality of hangers, one for each slot section, each hanger comprising a stem portion, two wings and a head, the stem portion being extended through a slot section, the head resting on portions of the lower wall which define the slot sections, the hangers being slidable longitudinally of their respective runners, the hanger wings extending outwardly from the stem and transversely of the runners, a plurality of T-bars, each having two ends, a leg and two side flanges, the flanges extending outwardly from opposite sides of the leg, the T-bars being of a length to extend transversely between a pair of adjacent runners and resting at their ends upon respective hanger wings and with said flanges being spaced below the wings, whereby the runners and bars form a grid network defining rectangular spaces, and a plurality of panels disposed in said spaces respectively, each panel having straight side and end edges, the side edges of the panels having longitudinally extending kerfs formed therein, said bar flanges being disposed in said kerfs respectively, at least some of the hanger wings being slidable and free of attachment to their respective T-bars, whereby the unattached hangers may be slid in a direction longitudinally of the runners and from under the unattached T-bars for dropping the unattached T-bars and their adjacent panels from the ceiling.

13. The ceiling construction of claim 12 in which said slot sections are continuous one with another throughout the length of their respective runners.

14. The ceiling construction of claim 12 in which said means for suspending the runners from said sections comprises clips, the upper wall of each runner having a plurality of elongate apertures formed therein, the clips being engageable with the undersurface of said upper wall for hanging the runners on the clips.

15. The ceiling construction of claim 14 in which said clips comprise eyelets for accommodating a hanger wire.

16. The ceiling construction of claim 14 in which said clips comprise J-shaped members adapted to engage over a channel beam.

17. The ceiling construction of claim 12 in which said slot sections are defined by spaced apart marginal portions extending upwardly from the lower walls of the runners respectively.

18. The ceiling construction of claim 12 in which at least some of the hangers have means thereon for fastening selected T-bars thereto to impart rigidity to the ceiling.

19. In a suspended ceiling of the class wherein a plurality of elongate runners are suspended from a support structure in parallel and uniformly spaced apart relationship and with the lower surfaces of the runners being disposed in a common plane, a plurality of uniformly spaced apart elongate T-bars supported by said runners and extending parallel to each other and perpendicular to and between pairs of adjacent runners respectively to form with said runners a grid network defining rectangular spaces, and a plurality of flat panels spanning said spaces respectively and supported by said T-bars, each T-bar having a vertically extending leg portion and side flanges extending longitudinally of and perpendicularly out from the leg portion, each panel having an upper surface, a lower surface, two opposed side surfaces and two opposed end surfaces, each panel having longitudinally extending kerfs formed therein extending inwardly from the panel side surfaces respectively and spaced between the upper and lower surfaces of the panel, the upper surfaces of the panels being disposed in a common plane extending under and parallel to the said plane of the lower surfaces of the runners, said T-bar flanges extending into said panel kerfs respectively; the combination with said T-bars and panels of support feet for the T-bars, said feet being integral with and extending perpendicularly out from respective sides of said vertically extending leg portion and contiguous the ends respectively of the T-bars, said feet being disposed in a common plane above said plane of the upper surfaces of the panels.

20. A T-bar for a grid network of a suspended ceiling for supporting flat panels of said ceiling, said T-bar comprising a flat leg portion having a longitudinally extending edge and two end edges, a pair of oppositely directed side flanges integral with and extending longitudinally of the leg portion between said end edges, said flanges being disposed in a common plane perpendicular to the leg portion, and two pairs of supporting foot flanges at each end respectively of said leg portion, said foot flanges being disposed in a common plane perpendicular to the leg portion, the plane of said foot flanges being parallel to the plane of said side flanges and being spaced between said longitudinal edge of the leg portion and the plane of said side flanges.

References Cited in the file of this patent

UNITED STATES PATENTS

| | | |
|---|---|---|
| 2,499,278 | Olsen | Feb. 28, 1950 |
| 2,822,584 | Urbain | Feb. 11, 1958 |
| 2,877,878 | Jantsch | Mar. 17, 1959 |